(12) United States Patent
Al-Karmi et al.

(10) Patent No.: US 6,370,269 B1
(45) Date of Patent: *Apr. 9, 2002

(54) OPTICAL CHARACTER RECOGNITION OF HANDWRITTEN OR CURSIVE TEXT IN MULTIPLE LANGUAGES

(75) Inventors: Abdel Naser Al-Karmi, Unionville (CA); Shamsher S. Singh, deceased, late of Rochester, MN (US), by Meenu Singh, legal representative; Baldev Singh Soor, Markham (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/784,652

(22) Filed: Jan. 21, 1997

(Under 37 CFR 1.47)

(51) Int. Cl.[7] .................................................. G06K 9/48
(52) U.S. Cl. ........................ 382/197; 382/186; 382/226; 382/253
(58) Field of Search .......................... 382/161, 170–179, 382/186–187, 197–198, 203, 209, 218, 226–229, 243, 253, 289, 296

(56) References Cited

U.S. PATENT DOCUMENTS

| | | | | |
|---|---|---|---|---|
| 5,050,219 A | * | 9/1991 | Maury | 382/186 |
| 5,151,950 A | | 9/1992 | Hulender | |
| 5,524,065 A | * | 6/1996 | Yagasaki | 382/226 |
| 5,533,147 A | * | 7/1996 | Arai et al. | 382/179 |
| 5,579,408 A | * | 11/1996 | Sakaguchi et al. | 382/187 |
| 5,734,750 A | * | 3/1998 | Arai et al. | 382/202 |
| 5,862,251 A | * | 1/1999 | Al-Karmi et al. | 382/186 |
| 5,901,255 A | * | 5/1999 | Yagasaki | 382/310 |
| 5,933,525 A | * | 8/1999 | Makhoul et al. | 382/186 |

FOREIGN PATENT DOCUMENTS

| | | |
|---|---|---|
| JP | 6115287 | 1/1986 |
| JP | 6128181 | 2/1986 |
| JP | 6292090 | 4/1987 |
| JP | 62198993 | 9/1987 |
| JP | 62210595 | 9/1987 |
| JP | 63308690 | 12/1988 |
| JP | 348379 | 3/1991 |
| JP | 3142693 | 6/1991 |
| JP | 4296989 | 10/1992 |

* cited by examiner

*Primary Examiner*—Jose L. Couso
*Assistant Examiner*—Gregory Desire
(74) *Attorney, Agent, or Firm*—F. Chau & Associates, LLP

(57) ABSTRACT

A method and apparatus for optical character recognition particularly suitable for cursive and scripted text in one or more of several languages follows the tracings of the script and encodes them as a sequence of directional vectors. It reads a preprocessed word or sub-word of interconnected characters as a unit and the characters are accepted in a specific language only if all characters in a unit have been recognized by testing against a first set of language-specific rules without leaving a remainder of any vectors in the unit. If there are vectors remaining unused, it moves a character marker to utilize more or fewer vectors for the current sub-word in order to obtain recognition. If the vectors do not form a character in a first language, the invention consults a second set of language-specific rules and follows similar steps to obtain recognition of one or more characters against the second set of language-specific rules. Also disclosed is a computer-usable medium, for example a magnetic or optical storage diskette, containing code means to execute the invention.

18 Claims, 5 Drawing Sheets

OPTICAL CHARACTER RECOGNITION OF HANDWRITTEN OR CURSIVE TEXT IN MULTIPLE LANGUAGES

FIELD OF THE INVENTION

The present invention relates to the field of optical character recognition (OCR) of cursive, normal handwriting by individuals. More particularly, it relates to the OCR of text that is written or printed in any of a plurality of languages where letters of the alphabet, even though small in number, may assume different shapes dependent on their position within a word, and which may connect to an adjacent character at their left, right, both, or not at all. It further relates to translation from one language, as represented by cursive script, to another. The method of the invention does not attempt to segment words into characters before recognition; rather it follows the writing strokes or traces from beginning to end; and only then attempts recognition of characters in a word (as in some English script) or in a sub-word or word (as in Arabic and cursive representations of many languages). An important feature of the invention is that it recognizes that sub-words may exist in a plurality of languages, and that an existing text may contain several languages; for example, it recognizes the common phenomenon that a quotation may be in a language different from the main language of the text.

BACKGROUND OF THE INVENTION

Examples of prior art directed to character segmentation are the following U.S. patents:

U.S. Pat. No. 4,024,500 granted May 17, 1977, and titled "Segmentation Mechanism for Cursive Script Character Recognition Systems".

U.S. Pat. No. 4,654,873 granted Mar. 31, 1987, and titled "System and Method for Segmentation and Recognition of Patterns".

U.S. Pat. No. 5,001,765 granted Mar. 19, 1991, and titled "Fast Spatial Segmenter for Handwritten Characters".

U.S. Pat. No. 5,101,439 granted Mar. 31, 1992, and titled "Segmentation Process for Machine Reading of Handwritten Information".

U.S. Pat. No. 5,111,514 granted May 5, 1992, and titled "Apparatus for Converting Handwritten Characters onto Finely Shaped Characters of Common Size and Pitch, Aligned in an Inferred Direction".

U.S. Pat. No. 5,151,950 granted Sep. 29, 1992, and titled "Method for Recognizing Handwritten Characters Using Shape and Context Analysis".

In U.S. Pat. No. 4,773,098 granted Sep. 20, 1988, and titled "Method of Optical Character Recognition", individual characters are recognized by means of assigning directional vector values in contour determination of a character.

In U.S. Pat. No. 4,959,870 granted Sep. 25, 1990, and titled "Character Recognition Apparatus Having Means for Compressing Feature Data", feature vectors having components which are histogram values are extracted and compressed then matched with stored compressed feature vectors of standard characters.

U.S. Pat. No. 4,979,226 granted Dec. 18, 1990, and titled "Code Sequence Matching Method and Apparatus", teaches code sequence extraction from an input pattern and comparison with a reference code sequence for character recognition.

U.S. Pat. No. 3,609,685 granted Sep. 28. 1971, and titled "Character Recognition by Linear Traverse", teaches character recognition in which the shape of the character is thinned to be represented by a single set of lines and converted to a combination of numbered direction vectors, and the set of direction vectors is reduced to eliminate redundant consecutive identical elements.

U.S. Pat. No. 5,050,219 granted Sep. 17, 1991, and titled "Method of Handwriting Recognition" is abstracted as follows:

"A method of recognition of handwriting consisting in applying predetermined criterions(sic) of a tracing of handwriting or to elements of this tracing so that several characterizing features of this tracing or of these elements be determined, comparing characterizing features thus determined to characterizing features representative of known elements of writing and identifying one element of the tracing with one known element of writing when the comparison of their characterizing features gives a predetermined result, wherein the improvement consists in the setting up of a sequence of predetermined operating steps in accordance with predetermined characterizing features by applying criterions to the tracing elements."

The above United States patents are incorporated herein by reference, where permitted. None of the known prior art, however, teaches how to deal with units of interconnected text tracings wherein vectors remain unused after all characters have been recognized, nor how to deal with the appearance of multiple languages within a single document or on a single page.

SUMMARY OF THE INVENTION

It has been found that a more efficient character recognition is achieved using encoded units of interconnected text tracings as a sequence of directions in a plane where the units are recognized as sub-words, where all vectors in the text tracings are used to create the character or language fragment being recognized, and where the vector sequences are tested against one or a plurality of sets of language-specific rules.

It has further been found that the amount of pre-processing, before recognition but after acquisition of the text image and noise reduction and filtering, is reduced if the input text is not segmented into constituent characters before it is presented to the recognition engine. Thus, the natural segmentation inherent in the text image (due to spacing between words and sub-words) is adhered to and exploited.

In the present disclosure and claims, "sub-words" mean the intra-connected portions of words that are bounded by a break in the cursive text, i.e. where successive characters are not bound by a ligature. Sub-words can be as long as the entire word or as short as one character, or even a portion of a character if, for example, the character includes a secondary feature.

The present invention provides an improvement to the known methods of optical character recognition in which the characters can comprise a plurality of languages, comprising an intermediate step wherein an acquired text image consisting of a sequence of planar directional vectors is analyzed by the recognition engine in chunks of intra-connected sub-words, the cursive text is parsed and a character marker is entered upon the recognition of each successive sub-word, and if unused vectors remain following the recognition of connected sub-units of text, then the text is reparsed by moving the character marker forward or backward one vector at a time until each vector in the sequence contributes to recognition of the characters of the text, as described in copending Canadian patent application S. N. 2139094. The recognition engine further uses a first set of language-specific rules, and if after exhausting the entries in the first set of language-specific rules a particular sub-word is not recognized, it compares that sub-word with a second set of language-specific rules until the sub-word is recognized.

The present invention further provides an apparatus for recognition of cursive text in one or more of a plurality of languages from a scanned image, including means for recognizing a sequence of directional vectors as characters only if all of the vectors have contributed to the recognition, means for reparsing the sequence of directional vectors until all of the vectors do contribute to recognition, at least two language-specific dictionaries, and means for comparing the sequence of direction vectors with the language-specific dictionaries. Code to control a computer for carrying out the steps of the method can be programmed onto a suitable medium, for example a magnetic storage diskette or a programmable read-only memory.

The present invention further provides a computer-usable medium containing program code executable by the computer to perform a method for recognition of cursive text in one or more of a plurality of languages from a scanned image, including reparsing a sequence of directional vectors by moving a character marker one vector at a time until each vector in the sequence contributes to recognition of the characters of the text from at least one set of language-specific rules. Examples of media suitable for the storage of such code are magnetically-encoded disks, optically-encoded disks, some forms of which are commonly called CD-ROMs, fixed disk drives and programmable read-only memories, including EPROMs, EEPROMs and flash memory cards. Such code can be readily transmitted in suitable forms, for example in binary-encoded forms on local or wide area networks or on public electronic transmission networks, for example the Internet.

The present invention further provides a computer program product comprising a computer-usable medium containing program code means for recognition of cursive text in one or more of a plurality of languages from a scanned image, the code comprising code means for causing the computer to encode text tracings as vectors, means to recognize the sequence of vectors as characters only if all vectors contribute to the recognition, means to reparse the sequence by moving a character marker, means to provide one or more sets of language-specific rules, means to compare each element of the sequence of vectors with the rules, and means to compare each element of the vector sequence to a second set of language-specific rules if the first set does not produce a match. The computer program product can be any convenient product suitable for storing and transmitting stored code, for example magnetic or optically-encoded disks or programmable read-only memories, including EPROMs, EEPROMs or flash memory cards.

Having recognized the language of the first character, the system of the invention continues to use the dictionary for that first language until it fails to obtain a match in that language. It then attempts recognition in another language until it finds a recognizable character. Thus recognition of the language and also the written text before segmentation is non-deterministic and dictated by the text itself.

Preferably, the sequence of planar directional vectors is obtained by processing according to methods known in the art: a noise-reduced and filtered digitized text image as follows:

(a) thinning or skeletonizing the text image to its essential skeleton (among other methods, for example, as taught by T. Wakayam in a paper titled "A case line tracing algorithm based on maximal square moving", IEEE Transactions on Pattern Recognition and Machine Intelligence, VOL PAMI-L1, No. 1, pp 68–74);

(b) converting the thinned image to directional vectors representing the directional flow of the tracings by the sequential data stream of the digitized image (for example, directional vectors are assigned to each element of the skeleton by means of the "Freeman code"); and (c) applying at least one reduction rule to the string of directional vectors to reduce it in length and yield one form of abstract representation of a word or sub-word. One simple reduction rule in a preferred embodiment specifies that a directional vector immediately following an identical directional vector be discarded. This rule may be applied recursively to a vector string, reducing it considerably.

Once the above intermediate pre-processing steps have been applied, language-specific identification of the sequence of directional vectors commences. For example, a set of language-specific grammar rules for a language in a first dictionary would include a look-up table defining each alphabet character by its most abstract (i.e. reduced) sequence of directional vectors. Further language-specific rules may restrict connectivity on either side, or may specify secondary features of a character such as a dot or dots (as in Arabic) or an accent (as in French). It is clear, therefore, that some experimentation will be necessary before arriving at an optimal set of grammar rules for a given language. The grammar rules may include provision for idiosyncrasies of individual writers; for example, some people write part of the alphabet, and print some characters, "r" and "s" being commonly printed in English manuscript. A second example is that some writers will cross a "t" with a horizontal stroke that does not intersect the vertical stroke, thus creating an additional sub-word.

In another embodiment, the invention provides a second set of language-specific grammar rules, which is accessed in turn in a way to be described below.

BRIEF DESCRIPTION OF THE DRAWINGS

The preferred embodiment of the present invention will now be described in detail in conjunction with the drawings, in which.

DETAILED DESCRIPTION OF THE PREFERRED EMBODIMENT

Figure 1:
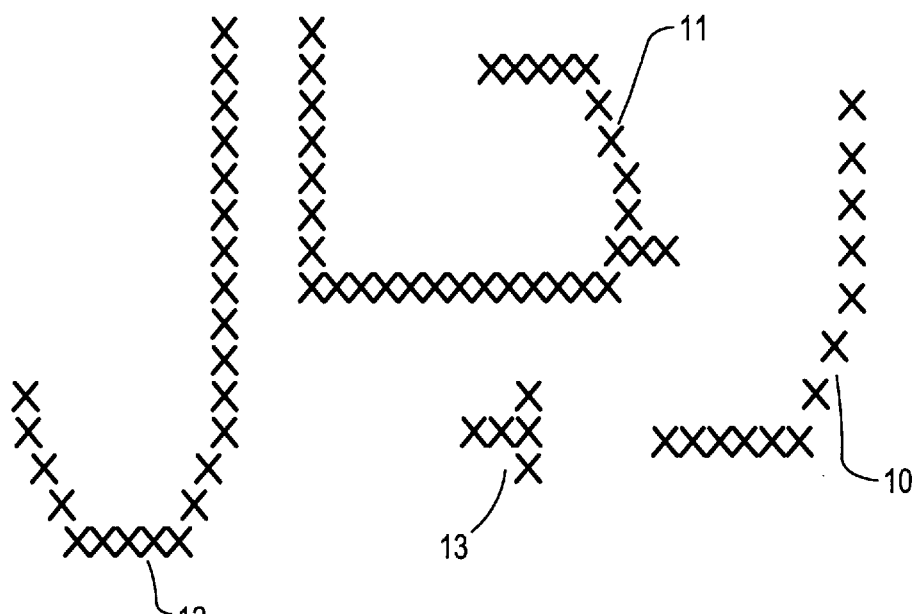
FIG. 1 depicts the skeleton of an example Arabic word "RIJAL" to which the method of the present invention is applied.

With reference to FIG. 1 of the drawings, the skeleton of the Arabic word "RIJAL" is shown ready for pre-processing.

Of course, the word is actually provided as a data stream representing the elements of an image matrix. As may be seen from FIG. 1, the word has four independent sub-words. A first sub-word 10 is simply the Arabic letter "Ra"; a second sub-word the two letters "Geem" and "Alef" 11; a third sub-word is the letter "Lam" 12; and the fourth sub-word is a secondary feature (SF) 13, being a "dot" under "Geem" in sub-word 11.

Figure 2:
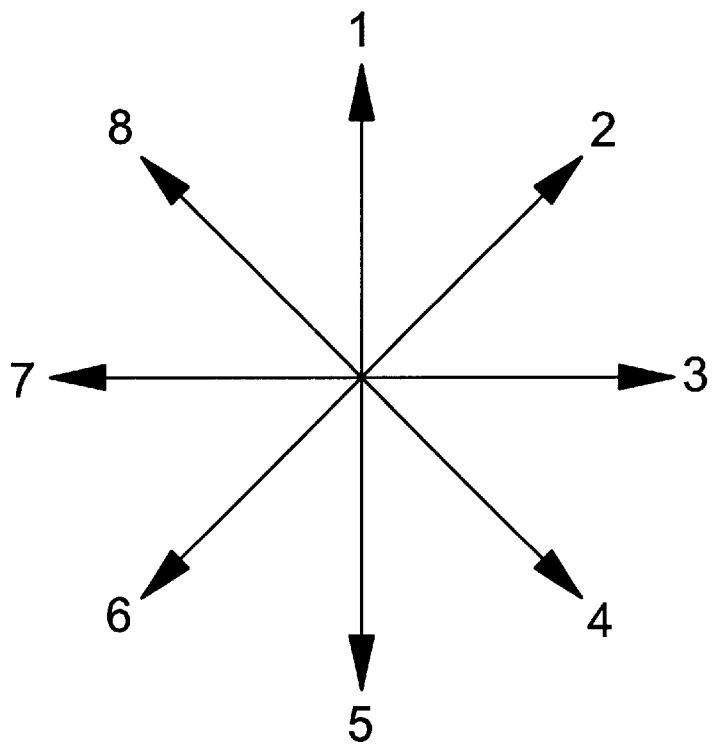
FIG. 2 shows eight directional vectors that can be used to encode a skeletonized word or sub-word into a string of directional vectors.

Applying the directional vectors (1 to 8) as shown in FIG. 2 to the sub-words of FIG. 1, results in a sequence for the first sub-word 10 as follows:

5555555666666677777777

With reference to FIG. 2 of the drawings, it may be advantageous to utilize more than eight directional vectors for finer resolution, e.g. 16,32, or more. However, using eight directions allows approximation of circular forms and is the minimum number required for most applications. By applying the example reduction rule, whereby a second identical directional vector is discarded, successively, the above-sequence is reduced simply to:

(5,6,7,$), the $ sign meaning end of sub-word.

By analogy, the entire word of FIG. 1 is reduced to the following coded string:

(5,6,7,$), (3,4,3,7,8,1,$), (SF), (5,6,7,8,1,$).

Figure 3:
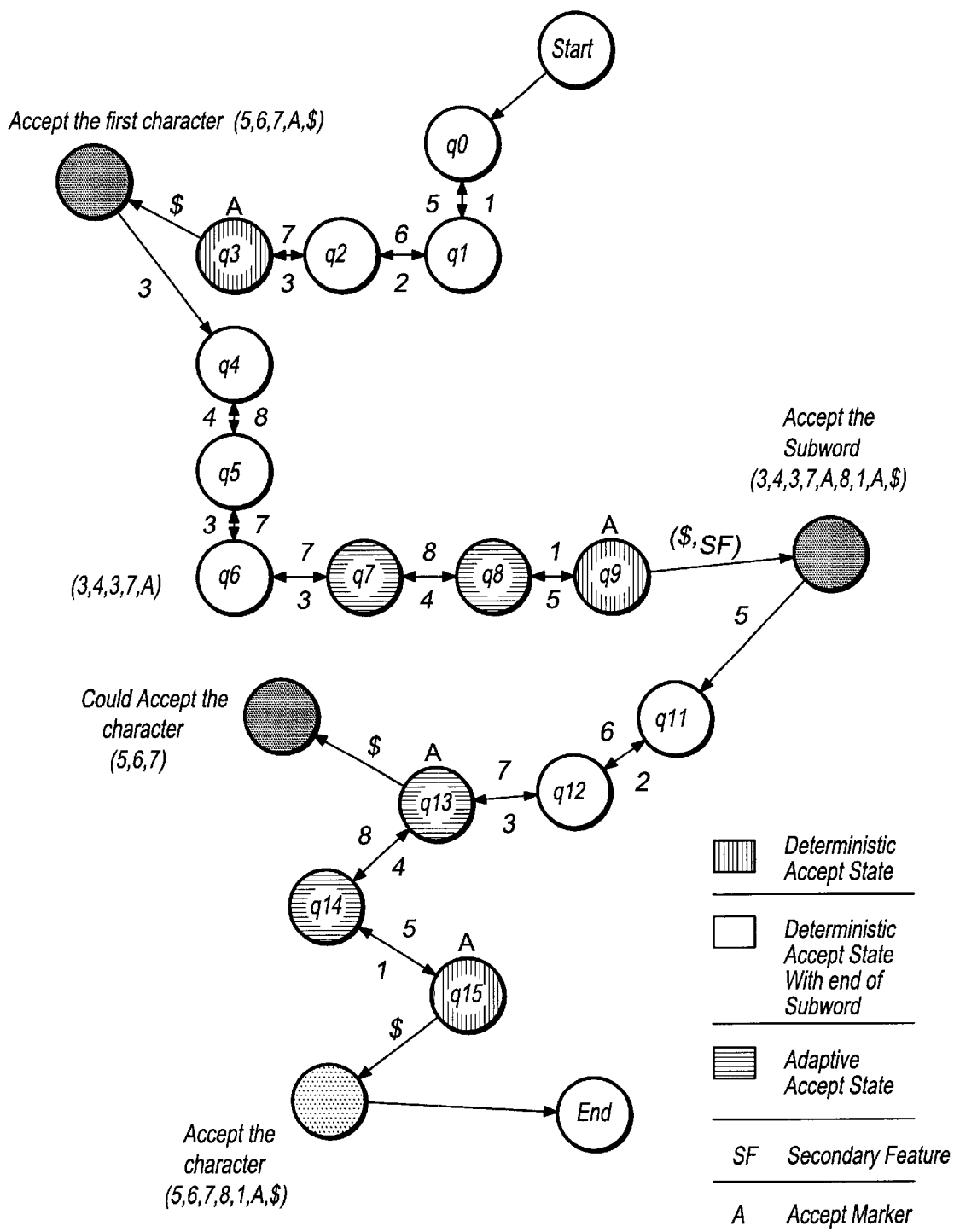
FIG. 3 depicts the states of a non-deterministic state machine for processing the encoded word "RIJAL" shown in FIG. 1.

It is this string that is applied to the state machine of FIG. 3, which proceeds from "start" through the transitions from q0 to q1 (5) q1 to q2 (6) and q2 to q3 (7). Because at q3 the first sub-word 10 terminates, the q3 state is a deterministic "accept state", since the vectors "5,6,7" are identified as the letter "Ra" and no directional vectors remain before "$".

The first sequence, therefore, identifies the first sub-word 10 as one letter (Ra). The second sequence (obtained by going from q4 to q9) is another sub-word 11 which comprises two letters. The (SF) indicates a presence of a secondary feature. The system will try to accept the sequence as it is pushed on to the system stack. The sequence, "3,4,3,7" is one letter while the other "8,1" is another. The following is the stack processing sequence:

* 3
* 4 3
* 3 4 3
* 7 3 4 3; (accept one letter);
* A
* 8 A
* 1 8 A
* $ 1 8 A; (accept the second letter), the "A" is the marker indicating acceptance of the preceding vector sequence (i.e. preceding letter).

The third sub-word 12 is the interesting one. The third sequence is for one letter but can be split into two letter sequences (5,6,7), (8,1). The stack processing looks like this:

| Vector sequence | Commentary |
| --- | --- |
| * 5 | First vector following previous marker |
| * 5, 6 | Second vector |
| * 5, 6, 7 | Third vector |
| * A | Recognize character and insert acceptance marker |
| * A, 8 | End of sub-word confirms recognition |

Thus, consulting the first set of language-specific grammar rules yielded that the (5,6,7) sequence is a separate character (the "alef") that may not be connected to any other character to its left. The (8,1) sequence is also a separate character but when processing is finished the stack is not empty; therefore, there is something following. Hence, the result cannot be accepted. The system then adaptively expands the previously parsed sequence to become (5,6,7,8,1) and attempts to recognize the new sequence. This yields the correct interpretation of the third sub-word.

Thus the method parses the elements applied adaptively and follows the natural spatial parsing of a language before individual character recognition.

Each word and sub-word is thus transformed into a sequence of directional vectors. The recognition process starts as this list of elements is fed into the state machine, herein called a Non-deterministic Finite Automaton. The Non-deterministic Finite Automaton will accept this sequence of directional vectors if and only if there exist pre-defined transition states (based on this sequence), that progress from the initial state to the final state. The fact that this is a non-deterministic state machine leads to the flexibility of accepting all inputs depending on the input sequence. It is not unusual to have a deterministic finite state machine constructed from a Non-deterministic Finite Automaton. But in this case, such a Deterministic Finite Automaton will contain a large number of states defined by 2 to the power of Q where Q is the number of states in the machine. However it is not necessary to have all these states used. This is exploited within the Non-deterministic Finite Automaton.

What this means is that the Non-deterministic Finite Automaton will encompass all possible words that are formed in a given alphabet, even though some of the "words" formed are meaningless and therefore not acceptable. This can be handled by the use of a dictionary, for example. Since the recognition is based on a scanned image that is subsequently thinned to produce directional vectors, the production rules of the Non-deterministic Finite Automaton will allow the system to either accept or reject this formation. The possibility of rejecting a sequence is understandable. But what the Non-deterministic Finite Automaton will attempt to do prior to rejecting the sequence is to attempt to "re-format" the string to see if the sequence can be accepted with more or fewer input elements. This adaptive nature of the Non-deterministic Finite Automaton makes it very powerful as a recognition engine and in its recognition rate.

Figure 4A:
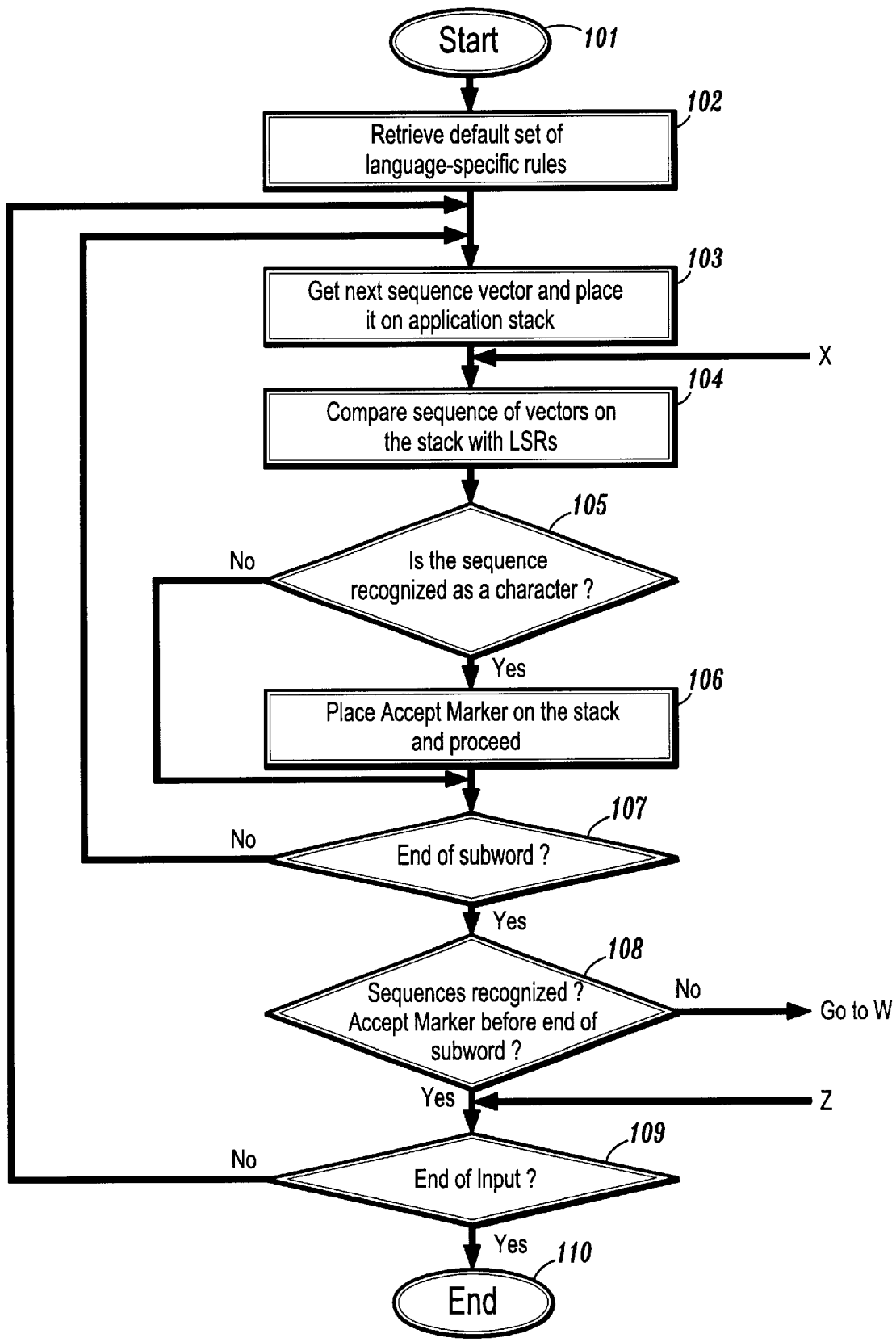
FIGS. 4A and 4B represent a high-level flow chart depicting how the present invention invokes the language-specific rules and makes use of a plurality of sets of language-specific rules to recognize cursive text in each language for which a set of language-specific rules is supplied.
Figure 4B:
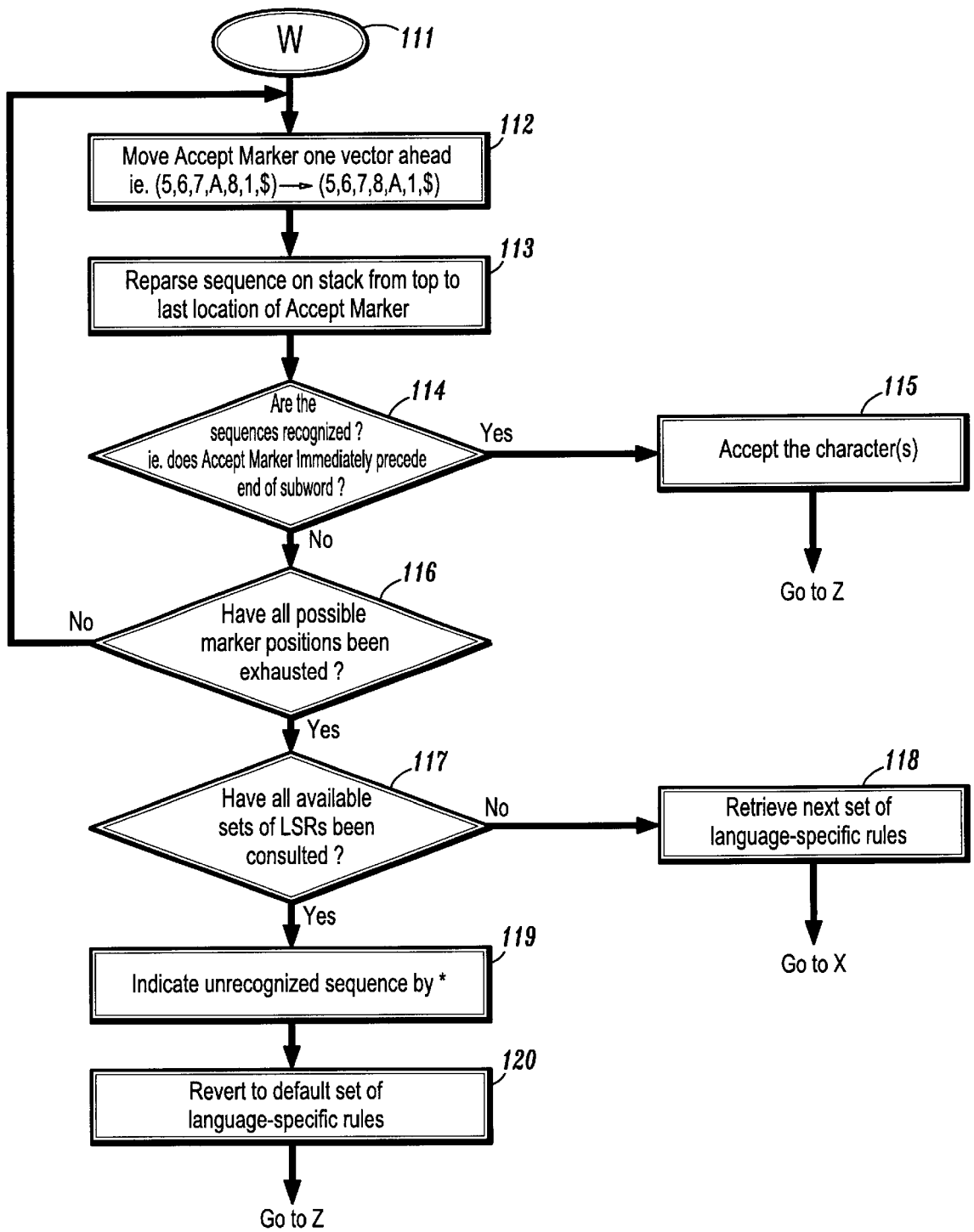

FIGS. 4A and 4B show a high-level flow chart for implementing the Non-deterministic Finite Automaton approach shown in FIG. 3. The flow chart particularly describes the method of the invention when using more than one set of language-specific grammar rules. The sets of rules may be stored on and accessed on a convenient medium, for example on a fixed disk drive such as high density disk drive 108 in FIG. 5. An example of such rules (in pseudo-code) is given below for the Arabic language.

```
/* Grammar Rules - Arabic */
/* TOKENS. */
     <punctuator> => OP_SEARCH
     <number> => NO_SEARCH
     <eof>
/* KEYWORDS. */
     UpwardOneDot UpwardTwoDots UpwardThreeDots
     DownwardOneDot DownwardTwoDots DownwardThreeDots
     One Two Three Four Five Six Seven Eight
/* PUNCTUATORS. */
     . $ #
/* TERMINALS. */
/* 1 2 3 4 5 6 7 8 */
/* NONTERMINALS. */
     Input
        —> File <eof>
     File
        —> SubwordSequence
        —> File SubwordSequence
SubWordSequence
        —> FeatureVector SubWordSequence
        —> SecondaryFeature SubWordSequence
        —> CharacterSequence Separator
        —> CharacterSequence PinSequence
        —> CharacterSequence SubwordSequence
CharacterSequence (the twenty-eight letters of the Arabic alphabet)
        —> Alef
        —> Ba
        —> Ta
        —> Tha
        —> Geem
        —> Hah
        —> Kha
        —> Dal
        —> Thal
        —> Ra
        —> Za
        —> Seen
        —> Sheen
        —> Tae
        —> Thae
        —> Sad
        —> Dhad
        —> Kaf
        —> Lam
        —> Meem
        —> Noon
        —> Ha
        —> Waw
        —> Ya
        —> Eain
        —> Ghain
        —> Ghaf
        —> Fa
(Definition of reduced character skeletons)
Alef
     —> 8,1,$
Lam
     —> 5,6,7,8,1,$
Ba
     —> 5,6,7,8,1,
       SecondaryFeature1, $
Ta
     —> 5,6,7,8,1,
       SecondaryFeature2, $
Tha
     —>5,6,7,8,1.
       SecondaryFeature3, $
Geem
     —>3,4,3,6,7,
       SecondaryFeature1, $
```

-continued

```
Hah
     —> 3,4,3,6,7,$
Kha
     —> 3,4,3,6,7,
       SecondaryFeature4, $
Dal
     —> 4,6,7,$
Thal
     —> 4,6,7,SecondaryFeature4, $
Ra
     —> 5,6,7,$
Za
     —> 5,6,7,SecondaryFeature4, $
Seen
     —> 5,6,7,8,4,7,8,4,7,$
     —> 5,6,7,8,4,7,8,4,7,5,6,7,8,1,$
Sheen
     —> 5,6,7,8,4,7,8,4,7
       SecondaryFeature3, $
     —> 5,6,7,8,4,7,8,4,7,5,6,7,8,1,SecondaryFeature3, $
Tae
     —>
. . . (and so forth)
SecondaryFeature
     —> DownwardOneDot
Pinsequence
     —> 8,6
/* END. */
```

It will be clear to the person skilled in the art that each set of language-specific rules forming a language-specific dictionary must contain at least one representation of each character such that the vector sequence approximating that representation will be recognizable as the particular character. Optionally, alternative representations of one or more characters can be provided in the language-specific rules, to accommodate various ways that different styles of penmanship may represent any given character on paper. For example, in English, a lowercase "r" may be printed by some people almost in the form of the typewritten letter, and drawn by others in a Gothic or Old English style. Thus, either style of writing would be recognized as the character "r". The following is an example of how the English word "eat" would be processed.

Once "eat" is scanned and skeletonized, the following sequence of vectors appears.

2,4,6,7,5,4,3,2,2,3,4,8,7,6,5,4,3,1,5,3,2,1,5,3,7,5,4,3, EOF

Note that this sequence of vectors is for only one sub-word which in this example happens to be the complete word. As the recognition scheme starts, the first letter, namely the "e" will be parsed and the first sequence (2,4,6,7) can be ambiguously identified as the letter "0", however, the next sequence (5,4,3,2) will not be recognized and hence the letter "e" can be obtained. The ambiguity increases as the sequence continues. Depending on the reduction and language rules, the second sequence (2,3,4,8,7,6,5,4,3,2,5) can be identified as either, "a", "u" or "o". Such situations are normally handled by enriching the language rules, by adding more than one sequence to identify the letter. Such procedure is normal to any cursive text that poses a large degree of ambiguity.

In order to handle text in a second language, the invention provides a second set of language-specific rules, similar in operation to the first set of language-specific rules exemplified above by the Arabic rules. Like the first set of language-specific rules, these rules may be stored on any convenient medium. For instance, initially on the CD ROM 522 or magnetic floppy disk 524 shown in FIG. 5; from there loaded into the disk drive 508, and then they may be brought into the testing steps by a convenient and efficient means or method, for example by loading them, partially or fully, into the operating memory 504 of the computer 500 used for performing the method. The second set of language-specific rules may be introduced by an operator or provided automatically by the computing system. Operator intervention may be valuable where the operator knows from inspection what languages are used in a given text; the operator can then select the order in which the system will bring in the sets of language-specific rules for testing. For example, if the operator knows that the main text is in Arabic but there is a quotation in English, Arabic can be selected as the first set of language-specific rules and English as the second. Alternatively, the system can be left to test against sets of language-specific rules randomly, and optionally to retain by any convenient means the list of successful sets.

Referring to FIG. 4A, the method of the invention commences at Start 101 with a preprocessed vector sequence. The first step 102 is to retrieve a set of language-specific rules from the appropriate storage medium. It is advantageous to set up the system so that the first set of language-specific rules that is retrieved is that set which is most likely to be encountered in the text to be recognized. However, because the system can utilize multiple sets of language-specific rules as described above, an operator need not preselect a particular set of language-specific rules. Preferably one set of language-specific rules is provided as a default in the system. The system then gets the next sequence vector from the preprocessed vector sequence and places it on an application stack at step 103. The system then compares at step 104 the sequence of vectors on the stack with the language-specific rules and, if the sequence is recognized as a character at decision step 105, it places an Accept Marker on the stack at step 106 and proceeds. If the sequence of vectors is not recognized as a character at decision step 105, no Accept Marker is placed on the stack. In either case, the system then tests at decision step 107 for the end of a subword, indicated in a preferred embodiment as described above by a $. If the end of a subword has not been reached, the system returns to step 103 and gets the next sequence vector and places it on the application stack. If the end of a subword has been reached, the system determines at decision step 108 whether all of the sequences have been recognized, that is whether an Accept Marker immediately precedes the end of the subword. If yes, then the system checks whether the end of the input has been reached, and if not, it recycles to the entry point of step 103. If the end of the input has been reached, then the procedure comes to an end at step 110.

Referring now to FIG. 4B, if all the sequences have not been recognized at step 108 in FIG. 4A, then the system proceeds to entry point W indicated as 111 on FIG. 4B.

In step 112, the system moves the Accept Marker one vector ahead; for example if the series of vectors is "5,6,7, A,8,1,$", then the Accept Marker is moved to produce the series "5,6,7,8,A,1,$". In step 113, the sequence on the stack is reparsed from the top to the immediately preceding location of the Accept Marker. Alternatively, if the sequence of vectors being tested is a sequence following the most recent Accept Marker, then the sequence is reparsed from the previous Accept Marker to the current position, that is, the last vector placed on the application stack. In decision step 114, the system tests whether the sequences are recognized, that is whether an Accept Marker immediately precedes the end of the subword. If the answer is yes, the character or characters will be accepted at step 115 and the system will be returned to point Z, the entry point to step 109 in FIG. 4A.

If the answer at decision step 114 is no, then at decision step 116 the system tests whether all possible combinations in the particular set of language-specific rules have been exhausted. If not, the system returns to the entry point to step 111. If, on the other hand, all combinations in the first set of language-specific rules have been tested and exhausted, the system determines at decision step 117 whether all available sets of language-specific rules have been consulted. If not, that is if there is a further set of language-specific rules to be tried, the system retrieves a next set of language-specific rules at step 118 and returns to X, the entry point to step 104 in FIG. 4A. If there is no further set of language-specific rules to consult, then the unrecognized vector sequence is indicated by a convenient symbol, for example an asterisk, at step 119, and the system reverts to the default set of language-specific rules at step 120, and proceeds to Z, the entry point to step 109 in FIG. 4A.

When the testing against the first set of language-specific rules concludes with vectors remaining, then the invention commences testing against the second set of language-specific rules, beginning with the first of the unrecognized remainder vectors and adding more vectors one-by-one as before. When a match is found, the character marker is inserted and more vectors are added for testing, preferably against the second set of language-specific rules as discussed above. Testing can be done against any of the sets of language-specific rules available; however, the most likely language to be found in any following vectors sequence is the language of the preceding sequence, and thus it may be advantageous to test first against the set of language-specific rules most recently found to be a match to the vector sequence.

Should one of the languages in the language-specific rules use text that appears in a different direction from the remainder of the text, for example in a right-to-left direction, then the second set of language-specific rules will be used in reverse until a match is found. For example, if a quotation in Hebrew is found in an English text, then the vector sequence will accumulate several vectors without finding a match in English. It will reach the end of a sub-word having all of the vectors in the subword unused. Thus the first set of language-specific rules will be exhausted without a match, and the second set of language-specific rules will be canvassed for a match. If, for example, the second set of language-specific rules happens to be Hebrew, then one of the language-specific rules will be "read from right to left". This rule will cause the vectors to be reversed in read-in sequence until a match is found. In a language in which a character can have several forms depending upon its position within a sub-word, the end-of-sub-word form is, for efficiency, advantageously selected for testing first. Further vectors are introduced to the sequence one at a time going to the right, that is, backwards, through the text. Alternatively, the system can skip further along the text in the original direction, for example to the next line, and test against the second set of language-specific rules until it determines where the quotation ends; at that point the testing can proceed in reverse back to the point where the second set of language-specific rules is introduced, and having recognized the entire portion of text in the right-to-left language, the system can then skip ahead in the original direction to where the first language resumes, and the first set of language-specific rules is retrieved and used for subsequent testing.

Advantages of the present method include: it is font-independent; it recognizes script regardless of where the person breaks the script; and it deals with typesets or stacked characters, for example, calligraphy, limited only by the data included in the sets of language-specific rules.

Figure 5:
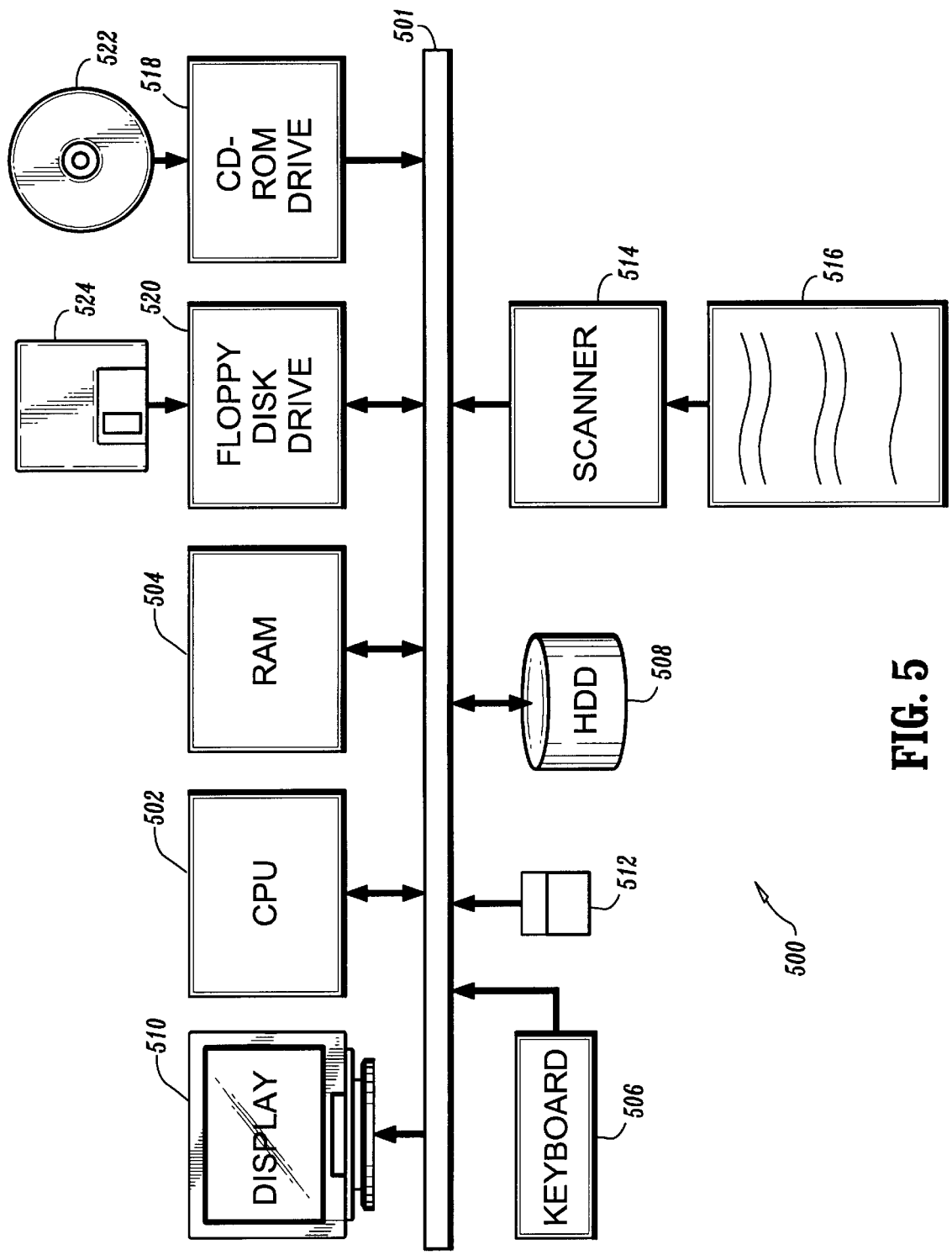
FIG. 5 is a block diagram of computer hardware for the present invention.

FIG. 5 shows a general purpose computer system 500 for the present invention. The computer system includes a control processing unit 502 connected by a bus 501 to a random access memory 504, a high density storage device 508, a keyboard 506, a display 510 and a mouse 512. Also attached to the CPU 502 by the bus 501, are: a scanner 514 for scanning into the computer 500 documents 516 to be analyzed; and CD-ROM and magnetic disc drives 518 and 520 for entry information from optical and floppy magnetic discs 522 and 524 containing program code and data of the present invention.

While the invention has been described with respect to the illustrated embodiment, it will be understood by those skilled in the art that various changes can be made without departing from the spirit and scope of the invention.

What is claimed is:

1. A method for recognition of cursive text in one or more of a plurality of languages from a scanned image, comprising:

(a) encoding units of interconnected text tracings as a sequence of directional vectors in a plane;

(b) thinning the vectorized tracings into a series of vectors having a nominal width;

(c) recognizing the sequences of directional vectors as comprising a sequence of characters of said text only if all the vectors in the sequence corresponding to any one of the units of interconnected text have contributed to recognition of said sequence of characters;

(d) reparsing the sequence of directional vectors until all vectors in the sequence contribute to the recognition of the sequence of characters, wherein the step of reparsing comprises moving a character marker one vector at a time until each vector in the sequence contributes to recognition of the sequence of characters;

(e) providing a plurality of language-specific rules in a first set of language-specific rules; and (f) comparing each element of the sequence of directional vectors with said first set of language-specific rules, wherein if an element of the sequence of directional vectors does not match any entry in said first set of language-specific rules, further comprising comparing each element of the sequence of directional vectors with the rules in a second set of language-specific rules.

2. A method as claimed in claim 1, wherein at least one of said initial set and next set of language-specific rules comprises a plurality of levels of definitions of vector sequences.

3. A method as claimed in claim 2, wherein each lower level of said levels of definitions comprises a greater number of alternative vector sequences describing character sequences in said set of language-specific rules.

4. The method of claim 1, wherein if there is no further set of language-specific rules for comparison with each element of the sequence, further comprising the steps of:

indicating any unrecognized vector sequence with a symbol; and reverting to a default set of language-specific rules.

5. The method of claim 1, wherein the character marker indicates recognition of a subword.

6. An apparatus for recognition of cursive text in one or more of a plurality of languages from a scanned image, comprising:

(a) means for recognizing a sequence of directional vectors as comprising a sequence of characters of said text only if all vectors in the sequence corresponding to any one of the units of interconnected text have contributed to recognition of said sequence of characters, wherein if vectors remain unused after all characters have been recognized, further comprising the step of:

(b) means for reparsing the sequence of directional vectors until all vectors in the sequence contribute to recognition of the sequence of characters, wherein the means for reparsing includes a means for moving a character marker one vector at a time until each vector in the sequence contributes to recognition of the sequence of characters; and (c) a first language-specific dictionary comprising a first set of language-specific rules for comparison with each element of the sequence of vectors, wherein if an element of the sequence of directional vectors does not match any entry in the first language-specific dictionary, further comprising a means for comparing each element of the sequence of directional vectors with a second language-specific dictionary.

7. The apparatus of claim 6, wherein if there is no further set of language-specific rules for comparison with each element of the sequence, further comprising:

means for indicating any unrecognized vector sequence with a symbol; and means for reverting to a default set of language-specific rules.

8. The method of claim 6, wherein the character marker indicates recognition of a subword.

9. A computer-usable medium containing program code executable by the computer to perform a method for recognition of cursive text in one or more of a plurality of languages from a scanned image, said method comprising the steps of:

(a) encoding units of interconnected text tracings as a sequence of directional vectors in a plane;

(b) thinning the vectorized tracings into a series of vectors having nominal width;

(c) recognizing the sequences of directional vectors as comprising a sequence of characters of said text only if all vectors in the sequence corresponding to any one of the units of interconnected text have contributed to recognition of said sequence of characters, wherein if vectors remain unused after all characters have been recognized, further comprising the step of:

(d) reparsing the sequence of directional vectors until all vectors in the sequence contribute to recognition of the sequence of characters, wherein the step of reparsing comprises moving a character marker one vector at a time until each vector in the sequence contributes to recognition of the sequence of characters;

(e) providing a plurality of language-specific rules in a first language-specific dictionary;

(f) comparing each element of the sequence of directional vectors with the rules in said first language-specific dictionary; and (g) if an element of the sequence of directional vectors does not match any entry in said first language-specific dictionary, then comparing each element of the sequence of directional vectors with the rules in a second language-specific dictionary.

10. A computer-usable medium as claimed in claim 9, wherein said medium is a magnetically-encoded diskette.

11. A computer-usable medium as claimed in claim 9, wherein said medium is an optically-encoded disk.

12. The computer-usable medium of claim 9, wherein the character marker indicates recognition of a subword.

13. The computer-usable medium of claim 9, wherein if there is no further set of language-specific rules for comparison with each element of the sequence, further comprising the steps of:
- indicating any unrecognized vector sequence with a symbol; and
- reverting to a default set of language-specific rules.

14. A computer program product comprising a computer-usable medium containing program code means embodied therein for recognition of cursive text in one or more of a plurality of languages from a scanned image, the computer readable program code comprising:
- (a) computer readable program code means for causing the computer to encode units of interconnected text tracings as a sequence of directional vectors in a plane;
- (b) computer readable program code means for causing the computer to thin the vectorized tracings into a series of vectors having nominal width;
- (c) computer readable program code means for causing the computer to recognize the sequences of directional vectors as comprising a sequence of characters of said text only if all vectors in the sequence corresponding to any one of the units of interconnected text have contributed to recognition of said sequence of characters;
- (d) computer readable program code means for causing the computer to reparse the sequence of directional vectors until all vectors in the sequence contribute to recognition of the sequence of characters, wherein the computer readable program code means for causing the computer to reparse includes a computer readable program code means for moving a character marker one vector at a time until each vector in the sequence contributes to recognition of the sequence of characters;
- (e) computer readable program code means for causing the computer to provide a plurality of language-specific rules in a first language-specific dictionary; and
- (f) computer readable program code means for causing the computer to compare each element of the sequence of directional vectors with the rules in said first language-specific dictionary, to compare each element of the sequence of directional vectors with the rules in a second language-specific dictionary.

15. A computer program product as claimed in claim 14, wherein said product comprises a magnetically-encoded disk.

16. A computer program product as claimed in claim 14, wherein said product comprises an optically-encoded disk.

17. The computer program product of claim 14, wherein the character marker indicates recognition of a subword.

18. The computer program product of claim 14, wherein if there is no further set of language-specific rules for comparison with each element of the sequence, further comprising:
- computer readable program code means for causing the computer to indicate any unrecognized vector sequence with a symbol; and
- computer readable program code means for causing the computer to revert to a default set of language-specific rules.

* * * * *